(12) United States Patent
Reimann

(10) Patent No.: US 6,751,975 B1
(45) Date of Patent: Jun. 22, 2004

(54) CONDENSATE REMOVAL SYSTEM ROOFTOP AIR CONDITIONER

(75) Inventor: Robert C. Reimann, LaFayette, NY (US)

(73) Assignee: Carrier Corporation, Farmington, CT (US)

(*) Notice: Subject to any disclaimer, the term of this patent is extended or adjusted under 35 U.S.C. 154(b) by 0 days.

(21) Appl. No.: 10/429,452

(22) Filed: May 5, 2003

(51) Int. Cl.[7] ............................ F25B 47/00; B60H 1/32
(52) U.S. Cl. ........................ 62/279; 62/244; 62/280
(58) Field of Search ........................ 62/279, 280, 288, 62/285, 244, 262

(56) References Cited

U.S. PATENT DOCUMENTS

| | | | | |
|---|---|---|---|---|
| 4,727,728 A | * | 3/1988 | Brown | 62/244 |
| 4,905,478 A | * | 3/1990 | Matsuda et al. | 62/244 |
| 5,337,580 A | * | 8/1994 | Zhao et al. | 62/262 |
| 5,461,879 A | * | 10/1995 | Bolton et al. | 62/280 |

* cited by examiner

Primary Examiner—Chen Wen Jiang
(74) Attorney, Agent, or Firm—Wall Marjama & Bilinski LLP

(57) ABSTRACT

Apparatus of removing condensate generated by a plurality of evaporator coils of a vehicular rooftop air conditioning unit. The unit further includes a condenser enclosure in which two opposed end walls are formed by a pair of condenser coils. A condenser fan is mounted for rotation in an opening in the top wall of the enclosure and is axially aligned along the central axis of the enclosure along with the fan motor which is suspended inside the enclosure beneath the fan. A slinger dish is mounted on the motor shaft beneath the motor in close proximity with the floor of the enclosure. The floor, in turn, slopes inwardly from all sides toward the center of the enclosure and condensate generated by the evaporator coils of the unit is channeled into the enclosure and collected in a recess beneath the motor. The slinger dish is arranged to draw condensate that is collected in the floor recess and distribute the condensate over the surfaces of the two condenser coils whereby the condensate is carried out of the unit in the form of a vapor.

9 Claims, 3 Drawing Sheets

CONDENSATE REMOVAL SYSTEM ROOFTOP AIR CONDITIONER

CROSS REFERENCE TO RELATED APPLICATIONS

This application is related to the following pending applications being concurrently filed herewith and assigned to the assignee of the present invention:

| Title | Our Docket No.: |
|---|---|
| Modular Rooftop Air Conditioner for a Bus | 210_546 |
| Modular Bus Air Conditioning System | 210_545 |
| Supply Air Blower Design in Bus Air Conditioning Units | 210_549 |
| Bus Rooftop Condenser Fan | 210_550 |
| Method and Apparatus for Refreshing Air in a Bustop Air Conditioner | 210_548 |
| Coil Housing Design for a Bus Air Conditioning Unit | 210_547 |
| Integrated Air Conditioning Module for a Bus | 210_558 |
| Fresh Air Intake Filter and Multi Function Grill | 210_554 |
| Integrated Air Conditioning Module for a Bus | 210_557 |
| Modular Air Conditioner for a Bus | 210_561 |
| Modular Air Conditioner for a Bus Rooftop | 210_562 |
| Evaporator Section for a Modular Bus Air Conditioner | 210_564 |
| Wide Evaporator Section for a Modular Bus Air Conditioner | 210_565 |
| Condensate Pump for Rooftop Air Conditioning Unit | 210_568 |
| Condensate Removal System Rooftop Air Conditioning | 210_551 |
| Modular Rooftop Unit Supply Air Ducting Arrangement | 210_577 |
| Configuration for Modular Bus Rooftop Air Conditioning System | 210_595 |
| Unibody Modular Bus Air Conditioner | 210_596 |

FIELD OF THE INVENTION

This invention relates to a low profile air conditioning unit for installation upon the roof of a vehicle and, in particular, upon the rooftop of a passenger bus.

BACKGROUND OF THE INVENTION

Rooftop air conditioners have been installed upon buses and the like for a number of years. Typically, both the condenser and the evaporator sections of the unit are mounted outside the passenger compartment of the vehicle upon the roof. Conditioned air from the unit is passed into the vehicle through an opening in the roof and return air is passed back into the unit through a second roof opening. The compressor servicing the unit is generally located in the engine compartment of the vehicle and is driven directly from the engine. Refrigerant lines are passed back from the engine compartment to the rooftop unit through the interior of the vehicle. These interior lines can pose a constant danger due to the lines leaking or sweating.

In U.S. Pat. No. 4,870,833 there is disclosed a rooftop air conditioning unit for a motor vehicle that utilizes an electrical driven compressor that is contained along with an inverter in the rooftop unit. Power to the unit is provided by a generator that is driven directly from the engine of the vehicle. In this arrangement the refrigerant lines passing between the engine compartment and the air conditioning unit are eliminated thus avoiding any danger of the lines leaking or sweating inside the vehicle. However, the removal of condensate from the rooftop unit itself still poses a problem.

A window air conditioner is described in U.S. Pat. No. 5,337,580 in which an axial flow condenser fan is mounted with the condenser coil and the compressor in the outdoor section of the unit. The evaporator coil is contained in the indoor section of the unit. A cone shaped condensate slinger is connected to the condenser fan motor and is arranged to throw condensate generated by the indoor evaporate coil against the outdoor condenser coil. A portion of the condensate that contacts the heated surfaces of the condenser coil is evaporated to improve the efficiency of the unit. The remaining condensate is collected in the condenser pan and is permitted to drain as moisture to the outdoors discharges from the unit as a vapor in the cooling air stream.

Many rooftop air conditioning units that are mounted on buses or recreational vehicles simple drain the condensate from the evaporator over the roof of the vehicle or multiple drain lines requiring costly installation and maintenance. The moisture, over a period of time forms an unsightly stain on the vehicles finish and films the window surfaces reducing the drivers visibility and thus posing a potential hazard. Attempts to incorporate more effective condensate removal systems for these types of roof top units invariably produce an increase in the height of the unit which, in turn, increase the amount of drag acting on the vehicle as it moves through the air.

SUMMARY OF THE INVENTION

It is a primary object of the present invention to improve rooftop air conditioning units for vehicles and, in particular, for buses, recreational vehicles and the like.

It is a further object of the present invention to more efficiently remove condensate from a rooftop air conditioning unit of a motor vehicle.

Another object of the present invention is to provide an effective way of removing condensate from a rooftop air conditioning unit that contains multiple evaporator coils and condenser coils.

A still further object of the present invention is to provide an efficient condensate removal system for a rooftop air conditioning unit for a bus or the like without having to increase the height and size of the unit.

Yet another object of the present invention is to remove condensate from the rooftop air conditioning unit of a bus in a clean and an aesthetically pleasing manor.

Yet another object is to eliminate installation and maintenance of condensate hoses and connections.

These and other objects of the present invention are provided by a rooftop air conditioning unit that includes multiple evaporator coils and condenser coils. An enclosure is mounted adjacent to the evaporator section of the unit that contains a pair of vertical side walls and a pair of opposed condenser coils that form the end walls of the enclosure. The enclosure further includes a bottom wall and a top wall that has an opening for housing a condenser fan. The fan is connected to the drive shaft of a fan motor which is suspended inside the enclosure. The drive shaft of the motor is aligned along the central axis of the enclosure and a slinger dish is mounted beneath the motor and is secured to the shaft. The bottom wall of the enclosure slopes inwardly for the side wall and end walls of the enclosure toward the central axis of the enclosure. Condensate generated by the evaporator coils is conducted into the enclosure and collects in the center of the enclosure beneath the slinger dish. The slinger dish opens upwardly towards the motor and contains a suction port for the drawing condensate collected in the center of the enclosure into the dish. A series of distribution ports direct the condensate over the inside surface of the dish and the condensate is then broadcast outwardly over the surfaces of the two condenser coils. The condenser coil are placed at an acute angle with regard to the central axis of the enclosure to considerable reduce the height of the unit. Preferably, each coil forms an angle of between 40° and 50° with the central axis of the enclosure.

BRIEF DESCRIPTION OF THE DRAWING

For a further understanding of these and objects of the present invention, reference will be made to the following detailed description of the invention which is to be read in association with the drawings, wherein.

DETAILED DESCRIPTION OF THE INVENTION

Figure 1:
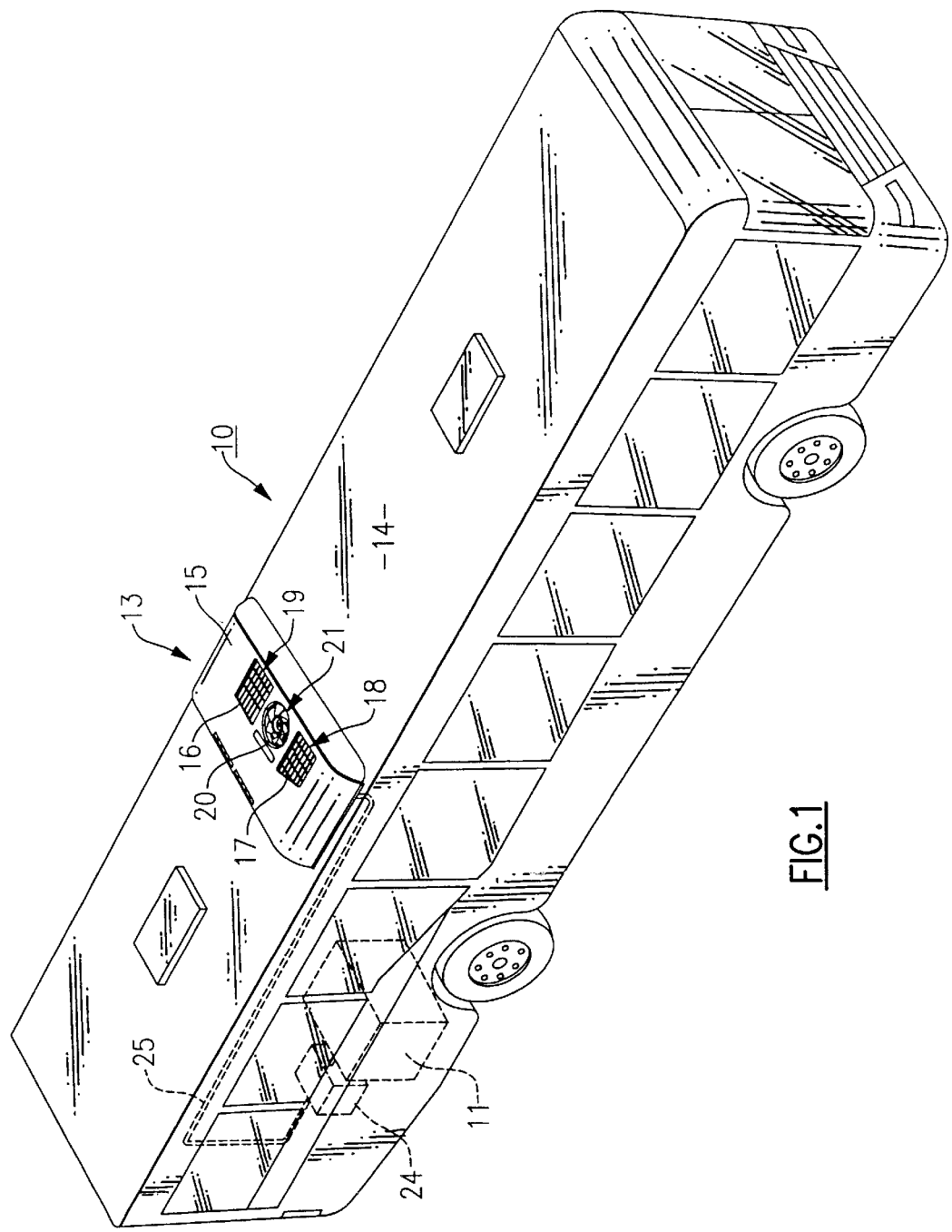
FIG. 1 is a perspective view of a bus that includes a rooftop air conditioning unit that encompasses the teachings of the present invention.

Turning initially to FIG. 1, there is shown a motorized bus that is generally references 10. The bus engine 11 is mounted in the rear of the vehicle in its own motor compartment. An air conditioning unit 13 is mounted upon the roof 14 of the bus and is arranged to provide conditioned air to the passenger compartment of the vehicle. The air conditioning unit is housed within a low profile cover 15 that is designed to reduce air resistance as the bus moves in a forward direction. A pair of openings 16 and 17 are provided in the top surface of the cover over the two condenser coils 18 and 19 of the unit. A circular opening 20 is also provided in the cover between openings 16 and 17 directly over the condenser fan 21. Outside air is drawn into the fan and is passed through the condenser coils to cool the coil heat exchanger surfaces before being exhausted upwardly by the fan 21.

As will be explained below, the present unit contains an electrically driven refrigerant compressor and an inverter for providing regulated current to the compressor and other electrical components of the unit including the condenser and evaporator fans. An electrical generator 24 is mounted in the motor compartment of the vehicle and is driven directly off the engine 11. The generator provides the necessary electrical input to the unit via electrical lines 25 that pass along the inside of the bus roof.

Figure 2:
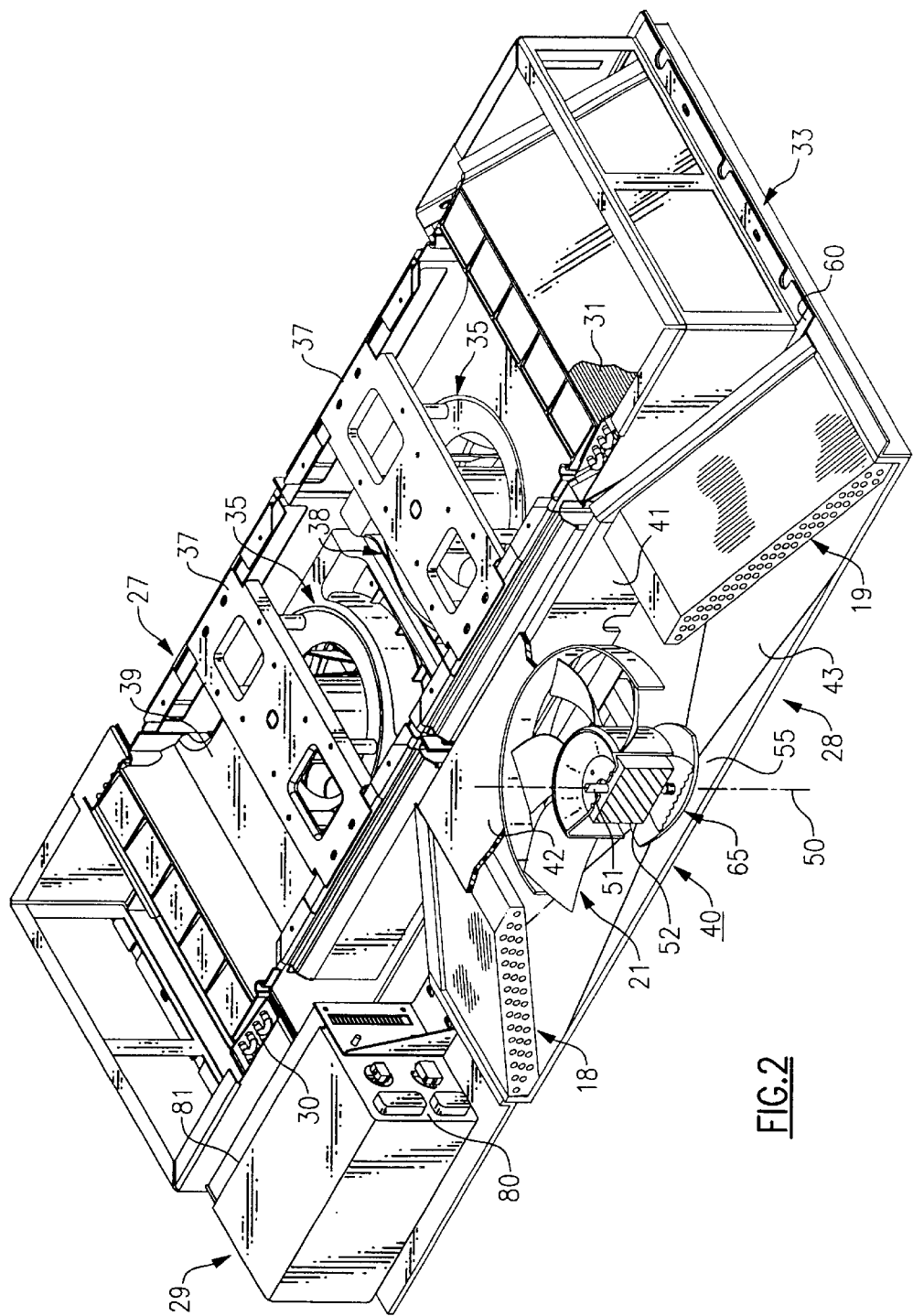
FIG. 2 is an enlarged perspective view of the air conditioning unit with the cover removed and parts broken away to more clearly show the internal components of the unit.
Figure 3:
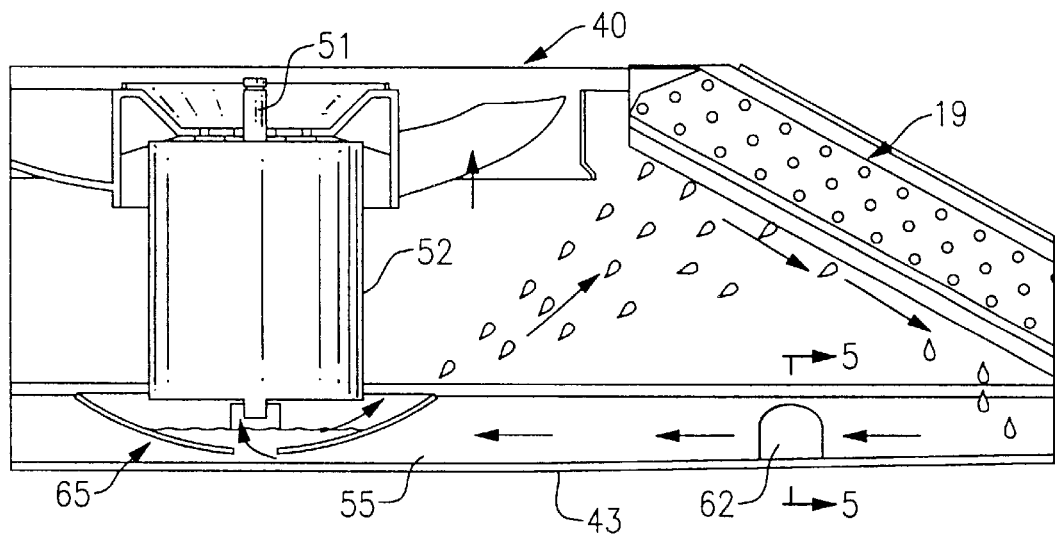
FIG. 3 is a partial side elevation of the condenser section of the air conditioning unit.

With further reference to FIGS. 2 and 3 there is illustrated the internal components of the rooftop unit. The unit contains three main sections that include an evaporator section 27, a condenser section 28 and a compressor and alternator section 29. The evaporator section 27 contains two opposed evaporator coils 30 and 31 that are inclined inwardly at an angle at either end of the support frame 33 of the unit. Each evaporator coil is serviced by its own evaporator fan 35 that is suspended from a cross member 37 supported in the top of the frame. Each evaporator fan is arranged to draw return air from the passenger compartment through a ceiling opening 38 and direct the return air over a companion evaporator coil via an air duct 39. The air is conditioned as it passes over the heat exchanger surfaces of the coil and is delivered back into the passenger compartment via a supply air opening (not shown) in the ceiling of the bus.

The condenser section 28 of the air conditioning unit is mounted upon the unit frame 33 immediately adjacent to the evaporator section 28. The condenser section includes an enclosure generally referenced 40 that houses the components of the condenser section. The enclosure includes a pair of opposed vertical side walls, one of which is denoted at 41, and two opposed end walls that formed by the previously noted condenser coils 18 and 19. The enclosure also includes a top wall 42 and a bottom wall 43. A circular opening is provided in the top wall of the enclosure and is axially aligned with the central vertically disposed axis 50 of the enclosure. A single condenser fan 21 is connected to the drive shaft 51 of an electrical motor 52 that is suspended inside the enclosure by any well known, suitable means. The motor and the drive shaft are both coaxially aligned along the vertical axis 50 of the housing.

The bottom wall 43 of the housing is inclined inwardly from side walls and end walls of the enclosure to create a low section or recess 55 in the floor directly under the condenser fan.

Figure 5:
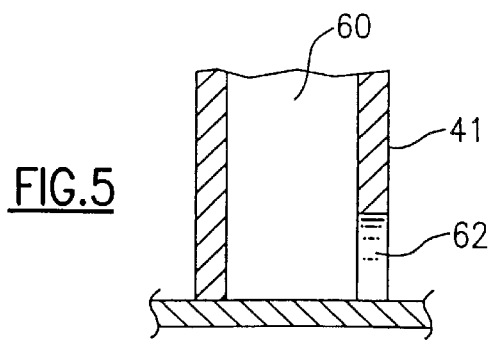
FIG. 5 is a sectional view taken along line 5—5 in FIG. 3.

As illustrated in FIG. 5, a channel 60 is located between the evaporator section of the housing and the condenser section. Condensate generated by the two evaporator coils is gravity fed into the channel through a suitable outlet port or, alternatively, a tube or the like leading from each evaporator section. The channel, in turn, is arranged to gravity feed the condensate to at least one inlet port 62 in side wall 41 of the condenser enclosure. The condensate is then conducted by the inclined floor of the enclosure to the recessed collection area 55 located beneath the condenser motor.

Figure 4:
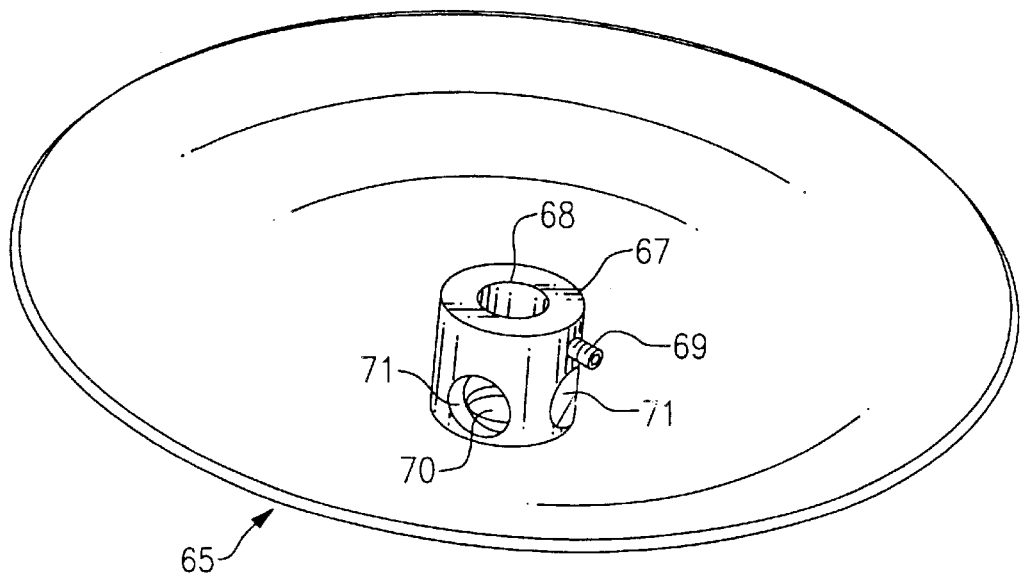
FIG. 4 is an enlarged perspective view of the slinger dish used in the practice of the invention for distributing condensate upon the heat exchanger surface of the two condenser coils.

The drive shaft of the condenser fan passes through the motor casing and extends downwardly from the bottom of the motor. A concave shaped slinger dish 65 (FIG. 4) is mounted upon the lower section of the drive shaft so that the dish can communicate with the condensate that is maintained within the collection area 55. As illustrated in FIG. 3, the dish is mounted on the motor shaft so that the dish opens upwardly towards the motor. A cylindrical mounting hub 67 is centrally located inside the dish and is integral with the dish. A central bore 68 passes through the hub and the motor drive shaft passes partially down into the bore. The shaft is locked to hub by a set screw 69 so that the dish turns with the motor shaft. The bottom section of the bore communicates with a suction port 70 that opens upwardly through the dish from the collecting region of the enclosure floor. A series of distribution ports 71 are circumferentially spaced around the bottom portion of the flange and are arranged to pass into the lower bore opening.

In operation, the dish is arranged to turn with the condenser fan at a relatively high speed which is sufficiently high enough to cause condensate in the collection area to be drawn into the bore of the flange through the suction port. The condensate in the bore is discharged from the flange through the distribution ports so that it contacts the inner surface of the dish. The spinning dish creates a relatively large centrifugal force that acts to drive the condensate outwardly from the dish surface and the condensate is broadcasted over the heat exchanger surfaces of the two condenser coils. The condensate is at least partially evaporated upon the two condenser coils and is carried out of the unit in the form of a vapor. The condensate that is not evaporated drops to the floor of the enclosure and is returned to the center collection region of the enclosure under the influence of gravity and is rebroadcasted over the condenser coils so that eventually all of the condensate passes out of the unit in the form of a vapor.

An electrically driven compressor 80 is mounted in the compressor and alternator section of the unit within a common housing along with a inverter 81. As noted, the inverter is arranged to receive power from the generator and to provide a regulated output to the compressor and the evaporator and condenser fans.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. Apparatus for removing condensate from a rooftop air conditioner unit for a vehicle that includes:

an evaporator section that contains a plurality of evaporator coils;

a condenser section that includes an enclosure mounted adjacent to said evaporator section, said enclosure having vertical side walls and opposed end walls formed by a pair of condenser coils;

said enclosure further including a top wall having a central opening that contains a condenser fan for rotation about a central vertical axis of the enclosure and a bottom wall that is arranged to direct condensate toward said center of said enclosure;

means for collecting condensate generated by said evaporator coils and conducting said condensate into said enclosure whereby the condensate is directed by the bottom wall of the enclosure toward the center of the enclosure;

a condenser fan motor mounted inside said enclosure beneath the condenser fan and having a drive shaft that is connected to said condenser fan; and a slinger dish secured to the condenser fan motor drive shaft beneath said motor, said slinger dish having a central suction port for drawing condensate collected in the center of the enclosure and for directing the condensate over the surfaces of the opposed condenser coils whereby said condensate is evaporated upon the heat exchanger surfaces of the condenser coils.

2. The apparatus of claim 1 wherein said slinger dish is a circular concave dish that opens upwardly toward said motor.

3. The apparatus of claim 1 wherein said dish includes a central mounting hub located inside said dish for connecting said dish to the motor shaft.

4. The apparatus of claim 3 wherein said hub contains a bore that passes upwardly through said hub.

5. The apparatus of claim 4 wherein said suction port in said dish draws condensate collected in said enclosure into the bore of said hub.

6. The apparatus of claim 5 wherein said hub contains a series of distribution ports circumferentially spaced about said hub which communicate with said bore.

7. The apparatus of claim 1 wherein said condenser coils are inclined with regard to the central axis of said enclosure.

8. The apparatus of claim 7 wherein each condenser coil forms an angle of between 40° and 50° with the central axis of said enclosure.

9. The apparatus of claim 1 wherein said means for collecting condensate from said at least one evaporator coil includes a drip pan mounted beneath said evaporator coil and a channel means for conducting said collected condensate to an inlet port formed in one said wall of the enclosure.

* * * * *